US005737174A

United States Patent [19]

Konieczynski

[11] Patent Number: 5,737,174

[45] Date of Patent: Apr. 7, 1998

[54] ARC SUPPRESSOR FOR SYSTEMS SUPPLYING ELECTRICALLY CONDUCTIVE COATING MATERIALS

[75] Inventor: Ronald D. Konieczynski, North Royalton, Ohio

[73] Assignee: Nordson Corporation, Westlake, Ohio

[21] Appl. No.: 634,942

[22] Filed: Apr. 19, 1996

[51] Int. Cl.[6] .......... H02H 9/06

[52] U.S. Cl. .......... 361/220; 218/11; 239/691

[58] Field of Search .......... 361/2, 3, 8, 13, 361/54, 58, 56, 91, 115, 116, 215, 220, 222; 218/1, 11, 17, 57, 59; 239/691; 313/146, 147

[56] References Cited

U.S. PATENT DOCUMENTS 5,341,990 8/1994 Konieczynski .......... 239/691

*Primary Examiner*—Ronald W. Leja

*Attorney, Agent, or Firm*—Holland & Knight LLP

[57] ABSTRACT

An arc suppressor is disclosed which includes at least one cartridge having a housing formed with a first end carrying an electrode, a hollow interior and a second end which mounts a cylinder whose piston head is axially movable within the interior of the housing. The electrode of the cartridge and the metal body of the cylinder are each electrically connected by wires to respective grounded and electrostatically charged elements of the voltage block device associated with a system for supplying electrically conductive coating materials. The piston head of the cylinder is caused to move proximate the electrode carried by the housing sufficiently in advance of the movement of the grounded and charged elements of the voltage block device toward one another so as to induce the formation of an electrostatic discharge or arc within the interior of the cartridge instead of between the elements of the voltage block device.

23 Claims, 3 Drawing Sheets

ARC SUPPRESSOR FOR SYSTEMS SUPPLYING ELECTRICALLY CONDUCTIVE COATING MATERIALS

FIELD OF THE INVENTION

This invention relates to systems for supplying and dispensing electrically conductive coating materials, and, more particularly, to an arc suppressor connected to a voltage block device within a system for supplying electrically conductive coating material in which electrostatic arcing or discharge is made to occur within the are suppressor instead of between the elements of the voltage block device.

BACKGROUND OF THE INVENTION

The application of coating materials using electrostatic spraying techniques has been practiced in the industry for many years. In these applications, the coating material is discharged in atomized form and an electrostatic charge is imparted to the atomized particles which are then directed toward a substrate maintained at a different potential to establish an electrostatic attraction for the charged atomized particles. In the past, coating materials of the solvent-based variety, such as varnishes, lacquers, enamels and the like, were the primary materials employed in electrostatic coating applications. The problem with such coating materials is that they create an atmosphere which is both explosive and toxic. The explosive nature of the environment presents a safety hazard should a spark inadvertently be generated, such as by accidentally grounding the nozzle of the spray gun, which can ignite the solvent in the atmosphere causing an explosion. The toxic nature of the workplace atmosphere created by solvent coating materials can be a health hazard should an employee inhale solvent vapors.

As a result of the problems with solvent-based coatings, the recent trend has been to switch to water-based coatings which reduce the problems of explosiveness and toxicity. Unfortunately, this switch to water-based type coatings has sharply increased the risk of electrical shock, which risk was relatively minor with solvent-based coatings. The problem of electrical shock has been addressed in U.S. Pat. Nos. 4,313,475; 5,078,168; 5,197,676; 5,221,194; and 5,341,990, all owned by the assignee of this invention. In systems of this type, a "voltage block" or air gap, is provided between one or more sources of the conductive coating material and the electrostatically charged coating material which is directed to the coating dispensers. This voltage block ensures that there is never an electrical path between the source of water-based coating material and the high voltage electrostatic power supply.

In systems of the type disclosed in the patents mentioned above, a voltage block device is provided which includes a filling station connected to one or more sources of coating material, a discharge station physically spaced from the filling station and connected to one or more coating dispensers, and, a shuttle movable between the filling station and discharge station. The shuttle is connected through coupling elements and supply lines to the inlet of a pump, preferably a piston pump, which receives coating material from the source when the shuttle is located at the filling station. The shuttle also has coupling elements connected by transfer lines to the outlet of the piston pump which is effective when the shuttle is located at the discharge position to transfer coating material to one or more coating dispensers. An air gap is continuously maintained between the source of coating material and the electrostatically charged coating dispensers by the controlled movement of the shuttle between the filling station and discharge station.

As noted above, an electrostatic charge is imparted to the atomized particles which are emitted from the coating dispensers connected via the shuttle and discharge station to the piston pump. At some point along the flow path between the piston pump and coating dispenser, a line from a high voltage electrostatic power supply is connected to electrostatically charge the coating material. The electrical line can be connected to the piston pump, to the coating dispenser or at other locations, but the entire flow path is subjected to the high voltage electrostatic charge, including the shuttle.

After a period of operation, the piston pump becomes emptied of coating material and it needs to be replenished from the source. A controller associated with the system senses the empty condition of the piston pump and causes the shuttle to disengage from the discharge station and move in a direction toward the filling station so that the piston pump can be refilled. Although the shuttle has disengaged from the electrostatically charged discharge station, it nevertheless retains an electrostatic charge which does not have sufficient time to bleed off in the course of movement of the shuttle from the discharge station to the filling station. As a result, an electrostatic discharge or arc can be produced as the electrostatically charged shuttle approaches the grounded filling station. Further, an arcing problem can occur upon movement of the shuttle in the reverse direction, e.g., from the grounded filling station to the electrostatically charged discharge station, after the piston pump has been replenished with coating material. In this instance, the controller moves the shuttle to the discharge station in order to provide a completed flow path from the piston pump, through the discharge station and then to the coating dispensers. In the course of movement of the shuttle from the filling station toward the discharge station, an electrostatic discharge or arc can be created between the shuttle and the electrostatically charged discharge station.

Although the formation of an electrostatic discharge or arc between the elements of voltage block devices in the manner described above is often harmless, it is contemplated that there nevertheless could be situations in which some danger of explosion might exist. In some applications, potentially explosive contaminants can be present in the air surrounding the voltage block device, and a flame or explosion could conceivably be produced or initiated by the formation of an electrostatic discharge or arc in the open air.

SUMMARY OF THE INVENTION

It is therefore among the objectives of the invention to provide an arc suppressor for use with a system for supplying electrically conductive coating material having voltage block devices, which substantially prevents the formation of electrostatic discharges among the elements of the voltage block device, and, which is capable of preventing the escape or propagation of any explosions or flames resulting from an electrostatic discharge to the open air surrounding the voltage block device.

These objectives are accomplished in an arc suppressor which includes at least one cartridge having a housing formed with a first end carrying an electrode, a hollow interior and a second end which mounts a cylinder whose piston head is axially movable within the interior of the housing. The electrode of the cartridge and the metal body of the cylinder are each connected by wires to respective grounded and electrostatically charged elements of the voltage block device associated with the system for supplying electrically conductive coating materials. The piston head of the cylinder is caused to move proximate the electrode carried by the housing sufficiently in advance of the movement toward one another of the grounded and charged elements of the voltage block device so as to induce the formation of an electrostatic discharge or arc within the interior of the cartridge instead of between the elements of the voltage block device.

One presently preferred embodiment of this invention is specifically adapted for use with a voltage block device of the type described above having a filling station connected to a source of electrically conductive coating material, a discharge station connected to one or more coating dispensers, and, a shuttle which is movable between the filling station and discharge station and is connected to the inlet and outlet of the piston pump. The filling station is held on ground potential, whereas the discharge station, piston pump, shuttle and coating dispenser(s) all become electrostatically charged during the course of operation of the system. With a voltage block device of this type, the arc suppressor of this invention comprises two identical cartridges mounted to opposite ends of a double acting piston having a single piston rod and a piston head at either end. Each of the cartridges comprises a dielectric outer housing, an inner sleeve concentrically mounted within the interior of the outer housing, and a cushioning element sandwiched therebetween which is preferably a length of silicone tubing wrapped in spiral fashion about the outer surface of the sleeve. One end of each cartridge is closed by a cap which mounts an electrode, and opposite ends of the outer housing each receive one of the piston heads movable within the interior of the sleeve in a direction towards and away from the electrode.

In the presently preferred embodiment, the electrode of one cartridge is connected by a first electrical wire to the grounded filling station, the electrode of the second cartridge is connected by a second electrical wire to the electrostatically charged discharge station, and, the metal housing of the cylinder is connected by a third electrical wire to a shuttle of the voltage block device. Each piston head of the cylinder reciprocates within their respective cartridges more quickly than the movement of the shuttle between the filling and discharge stations so as to induce the formation of an electrostatic discharge or arc within the cartridges, instead of between the shuttle and filling station or between the shuttle and discharge station. In particular, one piston head of the cylinder approaches the electrode of the first cartridge sufficiently in advance of the movement of the shuttle to the filling station so that in the event of the presence of a residual electrostatic charge on the shuttle after a coating operation has been completed, such charge will be bled off from the shuttle through the third wire to the cylinder, and, hence, via the piston head to the electrode grounded by its connection through the first wire to the filling station. Similarly, in the course of movement of the shuttle from the filling station toward the electrostatically charged discharge station, an electrostatic discharge or arc which would otherwise tend to develop between the shuttle and the charged discharge station is instead induced to form within the second cartridge as the second piston head moves toward the electrode of the second cartridge in advance of the arrival of the shuttle at the discharge station.

An alternative embodiment of the arc suppressor of this invention is specifically intended for use with a simplified system for supplying electrically conductive coating material. In this system, a voltage block device is employed which includes a filling station connected to a source of coating material and a shuttle directly connected to a pump, which, in turn, is connected to one or more coating dispensers. After a coating operation is completed in which the shuttle becomes electrostatically charged by its presence in the flow path of coating material to the dispenser(s), the shuttle is movable to the filling station in order to transfer coating material from the source and replenish the pump. In the course of such movement, an electrostatic discharge can be created between the charged shuttle and the grounded filling station where insufficient time is provided for the electrostatic charge to bleed off of the shuttle.

In order to overcome or suppress the formation of arcs in these types of voltage block devices, an arc suppressor according to this invention is employed which is essentially identical to the one described above except for the elimination of the second cartridge and the use of a single acting cylinder. In this embodiment, a single cartridge, identical to the construction of the cartridges described above, is connected to a single acting cylinder whose piston head is movable within the sleeve of the cartridge toward and away from the electrode mounted at one end of the cartridge housing. This electrode is connected by a first wire to the grounded filling station, whereas the metal body of the cylinder is connected by a second wire to the shuttle. The cartridge is operated in the same manner as described above to induce the formation of an electrostatic discharge within the interior of the cartridge, instead of between the shuttle and filling station, after a coating operation has been completed and when it is time to refill the pump with new coating material.

In either of the embodiments of the arc suppressor described above, the principal advantage provided is to substantially avoid the formation of an electrostatic discharge in the open air between elements of voltage block devices within electrically conductive coating supply systems. The cartridges in the arc suppressors are sealed from contaminants which may be present in the atmosphere surrounding voltage block devices, but in the event of a leak, the construction of the cartridges minimizes the chance of the propagation of flame or explosion therefrom. A comparatively small volume is provided within the interior of the housing, and therefore a limited quantity of explosive contaminants could be present at any one time in the event of a leak to create an explosion hazard. Further, the silicone tubing sandwiched between the inner sleeve and outer housing of the cartridge absorbs shock in the event of an explosion, and is itself closed to prevent the entry of any contaminants therein. Moreover, because the tubing is closed, and relatively small spaces are formed between the wraps of the tubing around the sleeve, there is essentially no path provided for a flame to propagate either interiorly or exteriorly of the sleeve and out of the housing of the cartridge. As such, any flame or explosion which might occur within the interior of the cartridges is substantially confined and prevented from escaping the interior of a cartridge.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
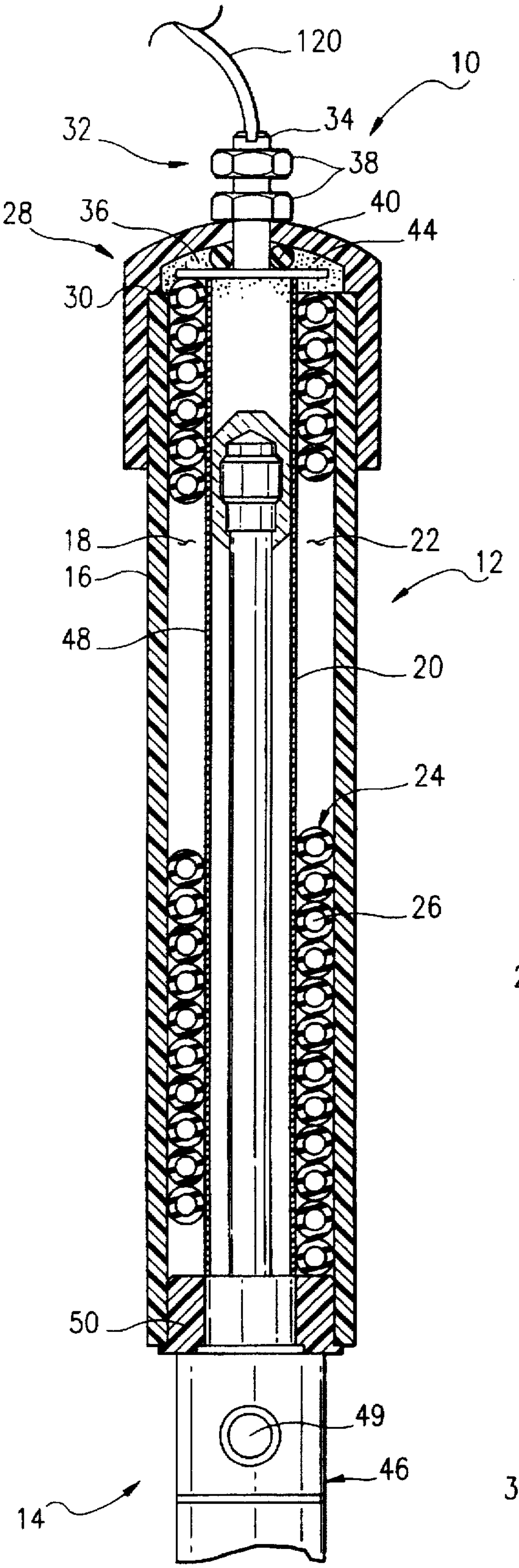
FIG. 1 is a cross-sectional view of one form of the arc suppressor of this invention, including a single cartridge.

Referring now to FIG. 1, one embodiment of an arc suppressor 10 is shown which includes a cartridge 12 connected to a pneumatic cylinder 14. The cartridge 12 comprises an outer housing 16 having opposed ends and a hollow interior 18, which is preferably formed of a dielectric material such as polyvinyl chloride. The outer housing 16 is cylindrical in shape, and its hollow interior 18 receives a smaller diameter sleeve 20 which is concentrically disposed therein, thus defining a space 22 therebetween. The sleeve 20 is preferably formed of Teflon®, which is a registered trademark of E. I. DuPont de Nemours & Company, or other low friction material.

In the presently preferred embodiment, the space 22 between outer housing 16 and sleeve 20 is occupied by a length of silicon tubing 24 having a hollow interior 26 closed at opposite ends. The silicon tubing 24 is wrapped in spiral fashion around the outside surface of sleeve 20 and snugly fits in the space 22 between the sleeve 20 and outer housing 16 in the position shown in FIG. 1.

One end of the outer housing 16 is closed by a cap 28 which frictionally engages and is chemically bonded to the outside surface of outer housing 16, and slides thereon until the end of outer housing 16 rests against a seat 30 formed in cap 28. A generally T-shaped electrode 32 is provided having a threaded stem section 34 which is insertable through a bore formed in the cap 28, and a head section 36 perpendicular to the stem section 34. The stem section 34 of electrode 32 is retained in position on the cap 28 by one or more nuts 38 threaded thereon, and an O-ring 40 extends between the head section 36 of electrode 32 and the wall of cap 28. When the cap 28 is mounted to the end of outer housing 16, the head section 36 of electrode 32 engages the facing end of sleeve 20 within the housing interior 18.

As illustrated in FIG. 1, the outer end of cap 28 is generally convex in shape, thus forming a space or cavity in the area between cap 28 and the ends of outer housing 16 and sleeve 20. This cavity is preferably filled with a dielectric grease 44 to create a seal therebetween, and also to resist the propagation of an electrostatic discharge exteriorly of the sleeve 20, as discussed below. Additionally, a layer 46 of dielectric grease is placed within the interior of sleeve 20 in contact with the head section 36 of electrode 32 for additional sealing and resistance to propagation of electrostatic discharge.

The cylinder 14 has a metal housing 46 from which a piston rod 48 is extendable and retractable by operation of pressurized air supplied through a port 49, as described below. The cylinder housing 46 is sealingly mounted to the opposite end of outer housing 16 of cartridge 12 by a bushing 50 as shown. The outwardly extending end of piston rod 48 carries a piston head 52 which is axially movable within the interior of the low friction sleeve 20 in a direction toward and away from the electrode 32 mounted at the opposite end of outer housing 16.

Figure 2:
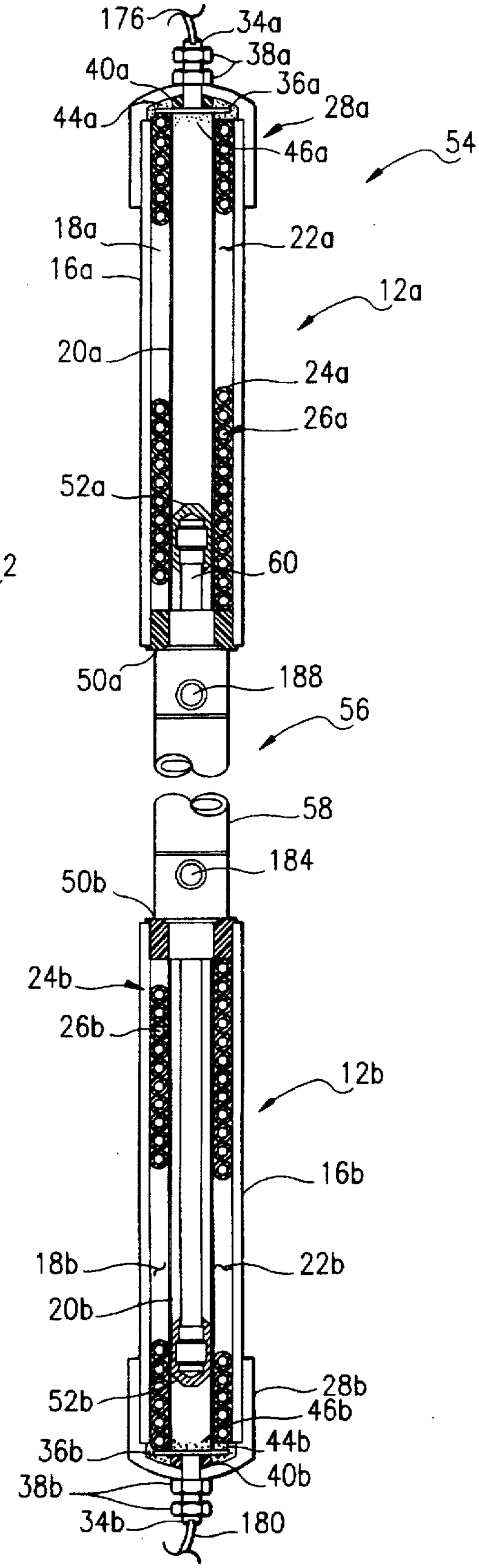
FIG. 2 is a view similar to FIG. 1, except illustrating an arc suppressor including two cartridges.

With reference to FIG. 2, an alternative embodiment of an arc suppressor 54 is illustrated which is intended for a different type of system for applying electrically conductive coating material, as described below. The arc suppressor 54 includes a double acting cylinder 56 having opposed ends mounted to a pair of cartridges **12*a* and 12*b*, which are essentially identical in structure and operation to cartridge 12 described above. As such, the same reference numbers are utilized in FIG. 2 to identify the same structure shown in FIG. 1 and described above in reference to cartridge 12, except for the addition of an "a" to identify the construction of cartridge 12*a* and the addition of a "b" to identify the structure associated with cartridge 12*b***.

The double acting cylinder 56 has a metal housing 58 which carries a piston rod 60 having one end which mounts a piston head **52*a* and an opposite end mounting a piston head 52*b*. Piston head 52*a* is axially movable within the sleeve 20*a* of cartridge 12*a*, and piston head 52*b* is axially movable within the sleeve 20*b* of cartridge 12*b*, in the same manner as described above in connection with a discussion of arc suppressor 10. Operating air is introduced into the cylinder 56 via air ports 184 and 188**.

Operation of Arc Suppressor 10

Figure 3:
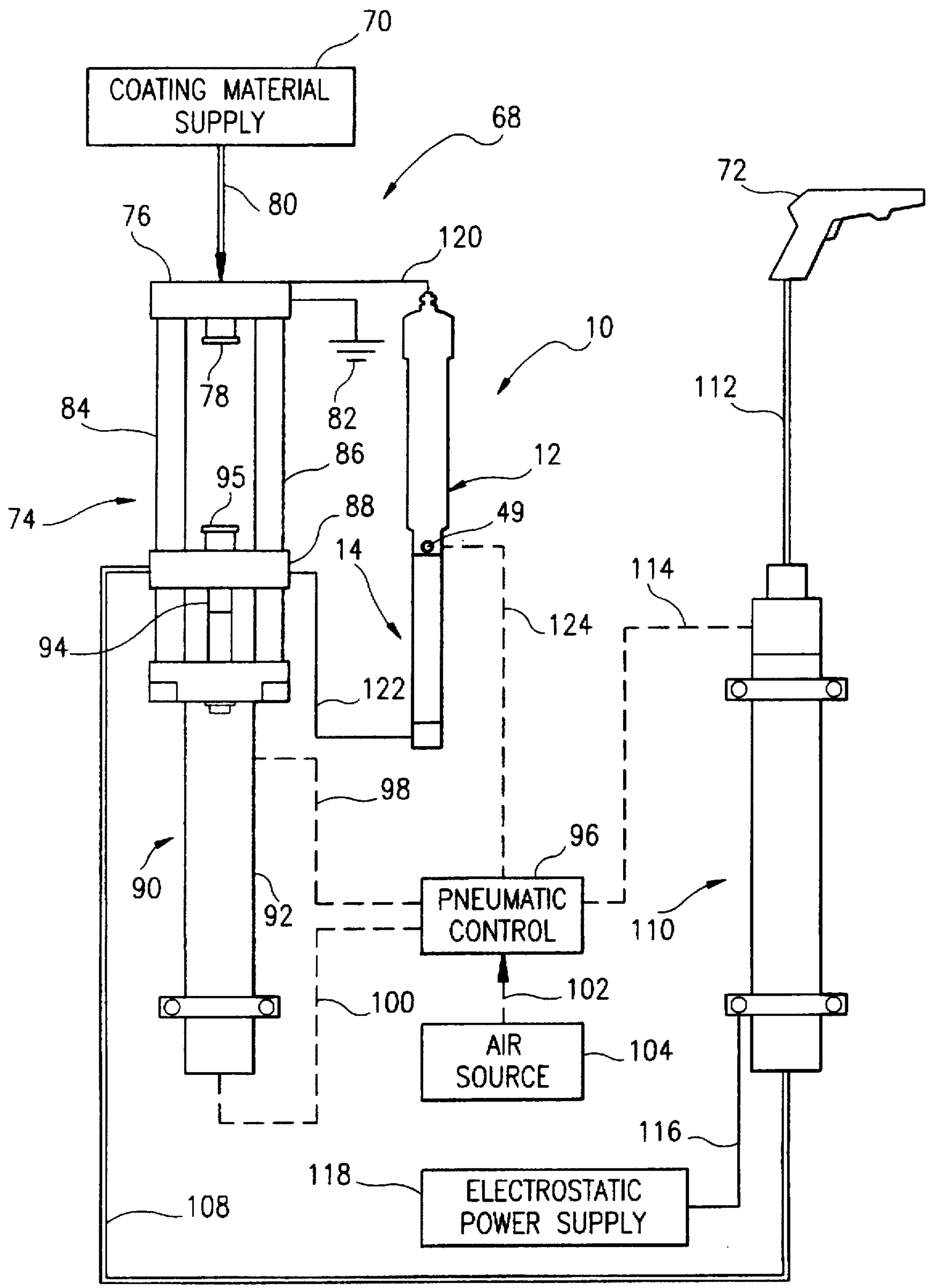
FIG. 3 is a schematic view of a system for supplying electrically conductive coating material having a voltage block device employing the arc suppressor shown in FIG. 1.

With reference to FIGS. 1 and 3, the arc suppressor 10 is shown in position within a system 68 for the delivery of electrically conductive coating material from a source 70 to one or more coating dispensers 72. It is believed helpful to illustrate the arc suppressor 10 and discuss its operation in the context of system 68, but it should be understood that the structure and operation of such system 68 is not intended to be exhaustive or in any way limiting of the applications within which arc suppressor 10 could be utilized in accordance with the teachings of this invention.

The coating supply system of FIG. 3 is shown herein for purposes of illustration, and its detailed construction forms no part of this invention of itself. Such construction is fully disclosed in U.S. Pat. Nos. 5,197,676 and 5,341,990, both owned by the assignee of this invention, the disclosures of which are incorporated by reference in their entireties herein. For purposes of the present discussion, the system 68 includes a voltage block device 74 having a filling station 76 which carries a male coupling element 78 connected to a line 80 from the coating material supply or source 70. The filling station 76 is grounded as at 82. The filling station 76 mounts a pair of spaced rods 84 and 86 along which a shuffle 88 is axially slidable by operation of a pneumatic cylinder 90. The pneumatic cylinder 90 has a cylinder housing 92 mounted to one end of each of the rods 84, 86, and a cylinder rod 94 connected to the shuttle 88. In response to the operation of pneumatic cylinder 90, the shuttle 88 is moved along the rods 84, 86 between a coupling or paint transfer position wherein a female coupling element 95 carried by the shuttle 88 engages the male coupling element 78 at the filling station 76, and a neutral, physically spaced position wherein the shuttle 88 is spaced from the filling station 76. Such operation of the cylinder 90 is governed by a pneumatic control 96 which is connected to the cylinder by a pair of air lines 98 and 100, and by a line 102 to a source of pressurized air 104. The pneumatic control 96 is schematically depicted by a box in FIG. 3, and the detailed construction and operation of same form no part of this invention. Reference should be made to U.S. Pat. No. 5,341,990 for a detailed discussion of the pneumatic control employed to control the operation of voltage block device 74 and dispenser 72.

The shuttle 88 is connected to a paint line 108 whose opposite end is connected to the base of a piston pump 110 of the general type disclosed in the aforementioned U.S. Pat. No. 5,078,168. The piston pump 110, in turn, is connected by a line 112 to the coating dispenser 72, and by an air line 114 to the pneumatic control 96. Preferably, an electrostatic charge is imparted to the metal housing of the piston pump 110, and the coating material passing therethrough, via an electrical line 116 from a high voltage electrostatic power supply 118.

The basic operation of the system 68 is as follows. When the piston pump 110 becomes emptied of coating material, the pneumatic control 96 is operative to deliver pressurized air through line 100 to the base of cylinder 90 causing its piston 94 to extend and move shuttle 88 in an upward direction in the orientation of the voltage block device 74 depicted in FIG. 3. This causes coupling elements 78, 95 to mate at the filling station 76 at which time coating material from source 70 is transferred to the pump 110 through a flow path defined by paint line 80, filling station 76, coupling elements 78, 95, shuttle 88 and paint line 108. Once the piston pump 110 is filled with coating material, the pneumatic control 96 directs pressurized air through line 98 causing the cylinder 90 to return the shuttle 88 to the position shown in FIG. 3 wherein the shuttle 88 is physically spaced from the filling station 76.

It can be appreciated that during operation of the dispenser 72, with the shuttle 88 in the position shown in FIG. 3, an electrostatic charge is carried upstream from the pump 110 through the electrically conductive coating material within line 108 to the shuttle 88. After the pump 110 is emptied and the shuffle 88 is moved to the filling station 76 to refill the pump 110, as described above, it has been found that an electrostatic charge is retained on the shuttle 88 which, in prior circumstances, could result in the formation of an electrostatic discharge or arc as a shuttle 88 approaches the grounded filling station 76.

The purpose of the arc suppressor 10 of this invention is to prevent the formation of an electrostatic discharge or arc between the shuttle 88 and filling station 76. To that end, a first electrical wire 120 is connected between the filling station 76 and the electrode 32 of cartridge 12, and a second electrical wire 122 is connected between the shuttle 88 and the metal housing 46 of cylinder 14. Additionally, an air line 124 is connected between the pneumatic control 96 and the cylinder 14 of arc suppressor 10 which controls the extension and retraction of piston rod 48 and piston head 52 within cylinder 14.

The pneumatic control 96 is effective to send a pulse of air through line 124 to the cylinder 14 of arc suppressor 10 at the same time or prior to the delivery of pressurized air through line 100 to the cylinder 90 of voltage block device 74. As such, the piston head 52 of cylinder 14 in arc suppressor 10 is timed to move to a position proximate the electrode 32 within outer housing 16 before the shuttle 88 reaches a similar position with respect to filling station 76. Because of the connection of wires 120 and 122 to the arc suppressor 10, the electrostatic charge carried by the shuttle 88 is "bled off" or transferred via wire 122 to the metal housing 46, piston rod 48 and piston head 52 of cylinder 14. The electrode 32, on the other hand, is held at ground potential by its connection through line 120 to the grounded filling station 76. Consequently, an electrostatic discharge or arc is induced within the interior of sleeve 20 and outer housing 16 between the now electrostatically charged metal piston head 52 and the grounded electrode 32. The electrostatic discharge travels to ground via the electrode 32, wire 120 and filling station 76, and the dielectric grease 44, 46 assists in preventing propagation of the arc exteriorly of the housing 16. No electrostatic discharge is thus permitted to take place between the shuttle 88 and filling station 76.

Operation of Arc Suppressor 54

The arc suppressor 54 operates in essentially the identical manner as described above in connection with arc suppressor 10, except that it is intended for use with a somewhat different type of system 126 for the supply of electrostatic coating material. The system 126 includes a source of coating material 128 connected by a supply line 130, grounded at 132, to the filling station 134 of a voltage block device 136. The filling station 134 mounts a male coupling element 138 which is mateable with a female coupling element 140 carried on a transfer shuttle 142 of the voltage block device 136. Preferably, the male and female coupling elements 138, 140 are of the same type as coupling elements 78 and 95 described above in connection with FIG. 3.

The shuttle 142 is movable along a pair of guide rods 142 and 143 which extend between the filling station 134 and a discharge station 146 of voltage block device 136. The bottom surface of shuttle 142 mounts a male coupling element 138 which is mateable with a female coupling element 140 carried on the discharge station 146. The shuttle 142 is movable between the filling station 134 and the discharge station 146 by operation of a cylinder 148 having a piston 150 connected to shuttle 142. In response to the supply of pressurized air via air lines 154 and 156 from a pneumatic control 158, connected by a line 159 to an air source 160, the piston 150 is extendable and retractable to move the shuttle 138 along guide rods 142, 143. When the air line 156 is pressurized, the piston 150 extends to move the shuttle 142 to a filling position wherein the male coupling element 138 at the filling station 134 mates with the female coupling element 140 on the shuttle 142. When the cylinder piston 150 is retracted in response to pressurization of cylinder 148 through line 154, the shuttle 142 is moved to a discharge position wherein the male coupling element 138 carried on the bottom surface of shuttle 142 mates with the female coupling element 140 at the discharge station 146. It should be understood that the detailed construction of pneumatic controller 158 forms no part of this invention of itself, and it is contemplated that essentially any commercially available programmable device which includes pneumatic valves (not shown) connected to air lines 154, 156 would be suitable for use herein.

In addition to the voltage block device 136, the system 126 includes a piston pump 162 of the same type as disclosed in U.S. Pat. No. 5,078,168. The inlet of piston pump 162 is connected by a fluid line 164 to the female coupling element 140 of shuttle 142, and the outlet of piston pump 162 is connected by a fluid line 166 to the male coupling element 138 on the shuttle 142. The female coupling element 140 at the discharge station 146 is connected by a fluid line 168 to one or more coating dispensers 170 which can be spray guns or rotary atomizers, as desired. In the illustrated embodiment of system 126, an electrostatic charge is applied to the coating material emitted from dispenser 170 by an electrostatic power supply 172 which is connected by an electrical line 174 to fluid line 168. It is contemplated that the electrostatic power supply 172 could be connected directly to the dispenser 170, to the piston pump 162 or to the discharge station 146, as desired, so long as an electrostatic charge is imparted to the coating material in the course of its movement from the piston pump 162 to the dispenser 170.

The general operation of system 126 is as follows. With the shuttle 142 in the position shown in FIG. 4, a completed fluid flow path is provided between the source 128 of coating material and the piston pump 162 for purposes of filling the piston pump 162 with coating material in preparation for a coating application. This flow path includes line 130, coupling elements 138, 140 at the filling station 134 and shuttle 142, respectively, and the fluid line 164 extending from the shuttle 142 to the piston pump 162. After the piston pump is filled with coating material 162, the pneumatic control 158 is operative to send pressurized air through line 154 thus causing cylinder 148 to retract its piston 150 and move shuttle 142 from the filling station 134 toward the discharge station 146. Because the discharge station 146 is connected by line 168 to the electrostatic power supply 172, a high voltage electrostatic charge is present at the discharge station 146. The approaching shuttle 142, which is not charged at this point, presents a surface toward which an electrostatic discharge or arc can move from the charged discharge station 146.

Figure 4:
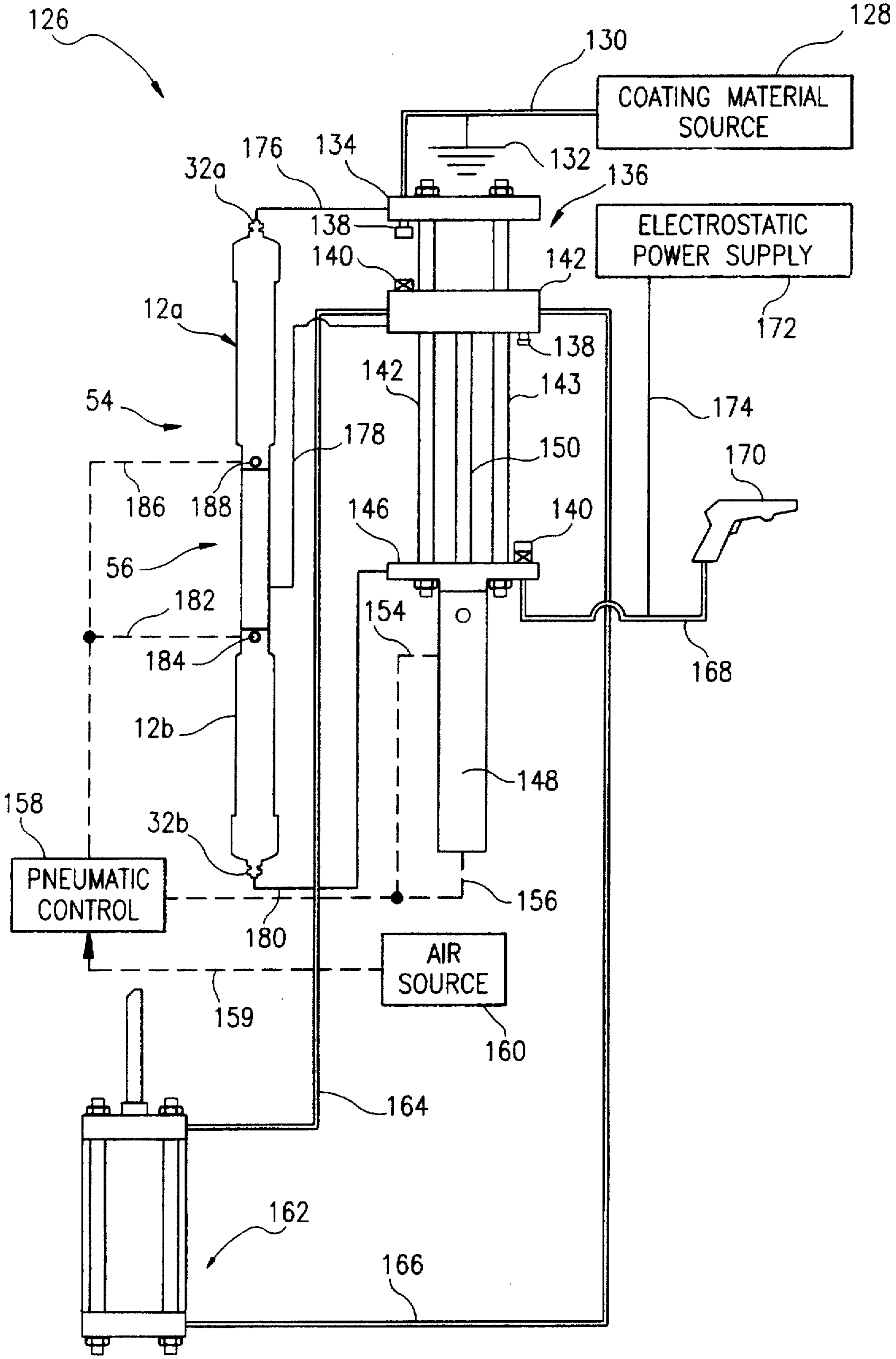
FIG. 4 is a view of an alternative embodiment of a system for supplying electrically conductive coating material having a voltage block of different design which employs the arc suppressor shown in FIG. 2.

The purpose of the arc suppressor 54 is to avoid the above-described propensity for an electrostatic discharge to develop between the shuttle 142 and discharge station 146. As shown in FIG. 4, the electrode 32a of cartridge 12a is connected by a wire 176 to the grounded filling station 134, the metal housing 58 of double acting cylinder 56 is connected by a second wire 178 to the shuttle 142, and, the electrode 32b of cartridge 12b is connected by a third wire 180 to the electrostatically charged discharge station 146. Prior to or simultaneous with the supply of pressurized air by pneumatic controller 158 through line 154 to cylinder 152, the pneumatic controller 158 also directs pressurized air through an air line 182 connected to the port 184 of double acting cylinder 56. In response, the double acting cylinder 56 is effective to extend its piston rod 60 in a downward direction, in the orientation of arc suppressor 54 shown in FIG. 4, so that the piston head 52b reaches a position within cartridge 12b proximate electrode 32b before the shuttle 142 arrives at a similar position with respect to discharge station 146. Because the shuttle 142 is connected by second wire 178 to the cylinder housing 56, and the electrode 32b of cartridge 12b is connected to the electrostatically charged discharge station 146 by line 180, an electrostatic discharge or arc is induced within the interior of cartridge 12b before such a discharge can be created between shuttle 142 and discharge station 146. As such, the electrostatic discharge which ensues is contained within the interior of the outer housing 16b of cartridge 12b, instead of externally between shuttle 142 and discharge station 146.

The cartridge 12a of arc suppressor 54 operates in a similar manner when the shuttle 142 is returned from the discharge station 146 to the filling station 134 as depicted in FIG. 4. It can be appreciated that with the shuttle 142 at the discharge station 146 during a coating operation, the shuttle 142 is subjected to an electrostatic charge through its connection to discharge station 146 and, hence, electrostatic power supply 172. Although the shuttle 142 disengages the discharge station 146 to move upwardly as shown in FIG. 4, there is insufficient time in the course of movement of the shuttle 142 to the filling station 134 for the electrostatic charge in shuttle 142 to completely bleed off. This potential problem of the creation of an electrostatic discharge or arc between shuttle 142 and filling station 134 is eliminated by cartridge 12a. As noted above, the electrode 32a of cartridge 12a is connected by line 176 to the grounded filling station 134, whereas the metal housing 58 of cylinder 56 is connected by line 178 to the shuttle 142. In response to a pressure signal from pneumatic control 158 through an air line 186 to a second port 188, the double acting cylinder 56 is effective to cause the piston head 52a within cartridge 12a to reach a position proximate electrode 32a sufficiently in advance of the upward movement of shuttle 142 toward filling station 134 so as to induce an electrostatic discharge within the interior of housing 16a and sleeve 20a between the piston head 52a and electrode 32a. This is effective to bleed off the electrostatic charge present on shuttle 142 before the shuttle 142 reaches a position with respect to the grounded filling station 134 where such discharge could otherwise occur in open air.

Each of the arc suppressors 10 and 54 thus operate in the environment of their respective systems 68 and 126 in a manner to avoid the development of an electrostatic discharge among the elements of the system voltage block devices 74 and 136.

As described above, an electrostatic discharge or arc is formed within the interior of the arc suppressors 10 or 54 which are completely enclosed and sealed from contaminants which may be present in the atmosphere surrounding voltage block devices 74, 136. Nevertheless, in the event of a leak, the construction of the cartridges 10, 54 minimizes the chance of the propagation of flame or explosion therefrom. Considering arc suppressor 10, for example, a comparatively small volume is provided within the interior of the housing 16, and therefore a limited quantity of explosive contaminants could be present at any one time in the event of a leak to create an explosion hazard. Further, the silicone tubing 24, sandwiched between the inner sleeve 20 ad outer housing 16 of the cartridge 12 absorbs shock in the event of an explosion, and is itself closed to prevent the entry of any contaminants therein. Moreover, because the tubing 24 is closed, and relatively small spaces are formed between the wraps of the tubing 24 around the sleeve 20, there is essentially no path provided for a flame to propagate either interiorly or exteriorly of the sleeve 20 and out of the housing 16 of the cartridge 12. As such, any flame or explosion which might occur within the interior of any of the cartridges 12, 12a or 12b is substantially confined and prevented from escaping the interior thereof.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the arc suppressors 10 and 54 depicted in the Figs. are shown in combination with representative systems for the delivery of electrically conductive coating material from a source of coating material to one or more coating dispensers. It is contemplated that arc suppressors 10 and 54 could be utilized with other "voltage block" type systems wherein a risk exists of an electrostatic discharge between elements held at different electrically potential.

Additionally, it should be understood that the arc suppressors 10 and 54 can be inverted from the position in which they are depicted in FIGS. 3 and 4, respectively, in which case wire 120 is connected to cylinder 14 and wire 122 is connected to electrode of 32 of arc suppressor 10, and wire 176 is connected to electrode 32b whereas wire 180 is connected to electrode 32a of arc suppressor 54.

Therefore, it is intended that the invention not be limited to the particular embodiment disclosed as the best mode contemplated for carrying out the invention, but that the invention will include all embodiments falling within the scope of the appended claims.

What is claimed is:

1. Apparatus for use with a voltage block device having a grounded filling station and an electrostatically charged transfer shuttle movable toward and away from the filling station, said apparatus comprising:

an outer housing having a first end, a second end and a hollow interior;

an electrode mounted at said first end of said housing;

a hollow sleeve concentrically disposed within said outer housing with a space therebetween;

a cushioning element located in said space between said outer housing and said sleeve;

a cylinder mounted to said second end of said outer housing, said cylinder having a piston head mounted to a piston rod, said piston head being movable within said sleeve in a direction toward and away from said first electrode upon extension and retraction of said piston rod;

a first wire electrically connected to said electrode and being adapted to connect to the filling station of the voltage block device, and a second wire electrically connected to said cylinder and being adapted to connect to the transfer shuttle of the voltage block device.

2. The apparatus of claim 1 in which said outer housing is formed of a dielectric material.

3. The apparatus of claim 1 in which said sleeve is formed of a low friction material to facilitate sliding movement of said piston head therealong.

4. The apparatus of claim 1 in which said cushioning element is a length of hollow tubing wrapped around said sleeve and sealed at opposite ends.

5. The apparatus of claim 4 in which said tubing is formed of silicone.

6. The apparatus of claim 1 in which said electrode is mounted by a cap to said first end of said outer housing and said cylinder is mounted by a bushing to said second end of said housing, said cap and said bushing substantially sealing said interior of said outer housing from the passage of contaminants therein.

7. The apparatus of claim 1 in which said electrode and said cylinder are formed of electrically conductive materials, said electrode being positioned within said outer housing so that in the course of movement of said piston head within said sleeve and toward said electrode an electrostatic discharge is created between said piston head and said electrode.

8. Apparatus for use with a voltage block device having a grounded filling station, an electrostatically charged discharge station and a transfer shuttle movable between the filling and discharge stations, said apparatus comprising:

a first cartridge and a second cartridge, each of said first and second cartridges including:

(i) an outer housing having a first end, a second end and a hollow interior;

(ii) an electrode mounted at said first end of said housing;

(iii) a hollow sleeve concentrically disposed within said outer housing with a space therebetween;

(iv) a cushioning element located in said space between said outer housing and said sleeve;

a cylinder mounted to said second end of said outer housing of each of said first and second cartridges, said cylinder having first and second piston heads mounted to opposite ends of a piston rod, said first piston head being movable within said sleeve of said first cartridge in a direction toward and away from said first electrode thereof, and said second piston head being movable within said sleeve of said second cartridge in a direction toward and away from said electrode thereof;

a first wire connected to said electrode of said first cartridge and being adapted to connect to the filling station of the voltage block device, a second wire electrically connect to said cylinder and being adapted to connect to the transfer shuttle of the voltage block device, and a third wire connected to said electrode of said second cartridge and being adapted to connect to the discharge station of the voltage block device.

9. The apparatus of claim 8 in which said outer housing of each of said first and second cartridges is formed of a dielectric material.

10. The apparatus of claim 8 in which said sleeve of each of said first and second cartridges is formed of a low friction material to facilitate sliding movement of said piston heads therealong.

11. The apparatus of claim 8 in which said cushioning element of each of said first and second cartridges is a length of hollow tubing wrapped around said sleeve and sealed at opposite ends.

12. The apparatus of claim 11 in which said tubing is formed of silicone.

13. The apparatus of claim 8 wherein in each of said first and second cartridges said electrode is mounted by a cap to said first end of said outer housing and said cylinder is mounted by a bushing to said second end of said housing, said cap and said bushing substantially sealing said interior of said outer housing from the passage of contaminants therein.

14. The apparatus of claim 8 in which said electrode of each of said first and second cartridges, and said cylinder, are formed of electrically conductive materials, each of said electrodes being positioned within their respective outer housings so that in the course of movement of said piston heads within their respective sleeves and toward said electrode an electrostatic discharge is created between said piston heads and said electrodes.

15. An apparatus for supplying electrically conductive coating material comprising:

a voltage block device including an electrically grounded filling station adapted to connect to a source of electrically conductive coating material, a discharge station adapted to connect to at least one coating dispenser and to an electrostatic power supply, and, a shuttle having coupling elements engageable with mating coupling elements carried by said filling station and said discharge station;

a pumping device having an inlet connected to said coupling element of said shuttle which mates with said coupling element at said filling station, said pumping device having an outlet connected to said coupling element of said shuttle which mates with said coupling element at said discharge station;

an arc suppressor including a first cartridge, a second cartridge and a cylinder mounted between said first and second cartridges, said cylinder having a piston rod and first and second piston heads mounted at opposite ends of said piston rod, each of said first and second cartridges having a first end which mounts an electrode and a hollow interior within which respective first and second piston heads are axially movable;

a first wire electrically connected between said electrode of first cartridge and said filling station, a second wire electrically connected between said shuttle and said cylinder and a third wire electrically connected between said electrode of said second cartridge and said discharge station.

16. The apparatus of claim 15 in which each of said first and second cartridges includes:

an outer housing having a first end, a second end and a hollow interior;

a hollow sleeve concentrically disposed within said outer housing with a space therebetween;

a cushioning element located in said space between said outer housing and said sleeve.

17. The apparatus of claim 16 in which said cushioning element is a length of hollow tubing wrapped around said sleeve and sealed at opposite ends.

18. The apparatus of claim 17 in which said tubing is formed of silicone.

19. An apparatus for supplying electrically conductive coating material, comprising:

a voltage block device including an electrically grounded filling station adapted to connect to a source of electrically conductive coating material, and a shuttle having a coupling element engageable with a mating coupling element carried by said filling station, said shuttle communicating with an electrostatic power supply;

a pumping device having an inlet connected to said shuttle and an outlet adapted to connect to at least one coating dispenser;

an arc suppressor including a cartridge and a cylinder having a piston rod carrying a piston head, said cartridge having a first end which mounts an electrode and a hollow interior within which said piston head is axially movable;

a first wire electrically connected between said electrode and said grounded filling station, and a second wire electrically connected between said cylinder and said shuttle.

20. The apparatus of claim 19 in which said cartridge of said arc suppressor includes:

an outer housing having a first end, a second end and a hollow interior;

a hollow sleeve concentrically disposed within said outer housing with a space therebetween;

a cushioning element located in said space between said outer housing and said sleeve.

21. The apparatus of claim 20 in which said cushioning element is a length of hollow tubing wrapped around said sleeve and sealed at opposite ends.

22. The apparatus of claim 21 in which said tubing is formed of silicone.

23. The method of suppressing the formation of electrostatic arcs between elements of a supply system for supplying electrically conductive coating material, comprising:

electrically connecting the grounded filling station of a voltage block device of the supply system to the electrode of a cartridge of an arc suppressor, the filling station being connectable to a source of electrically conductive coating material;

electrically connecting the shuttle of the voltage block device to an electrically conductive cylinder of the arc suppressor, the shuttle being movable to said filling station to effect the transfer of coating material to a pumping unit connected to at least one electrostatically charged coating dispenser;

causing the piston head of the cylinder to move to a position proximate the electrode within the cartridge sufficiently in advance of the movement of the shuttle to the filling station so as to induce the formation of an electrostatic discharge between the piston head and electrode instead of between the shuttle and filling station.

* * * * *